J. A. PICKENS.
WEIGHING SCOOP.
APPLICATION FILED MAY 28, 1914.

1,116,727.

Patented Nov. 10, 1914.
2 SHEETS—SHEET 1.

Witnesses
Fenton S. Belt
J. W. Sherwood

Inventor
James A. Pickens
By Franklin H. Hough
Attorney

J. A. PICKENS.
WEIGHING SCOOP.
APPLICATION FILED MAY 28, 1914.
1,116,727.
Patented Nov. 10, 1914.
2 SHEETS—SHEET 2.
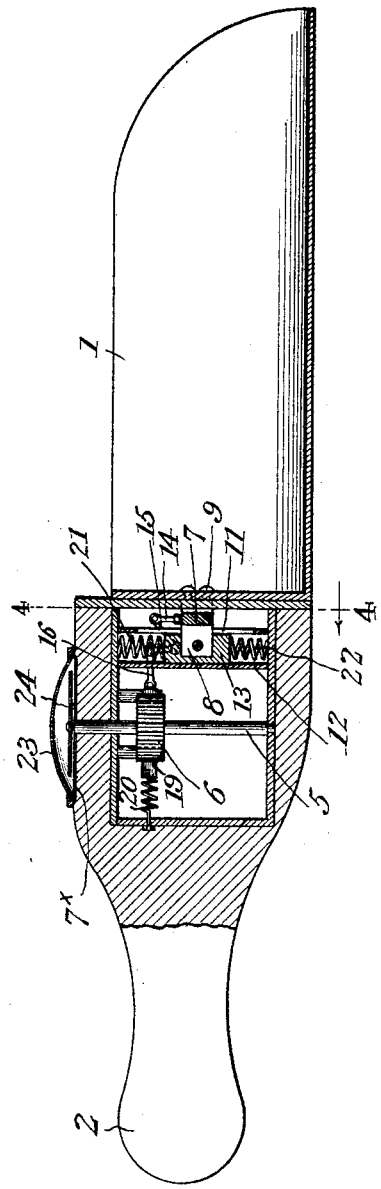
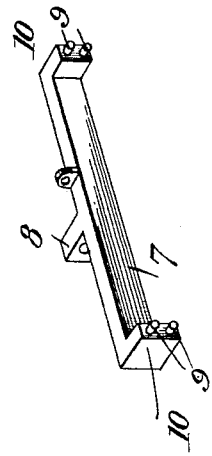
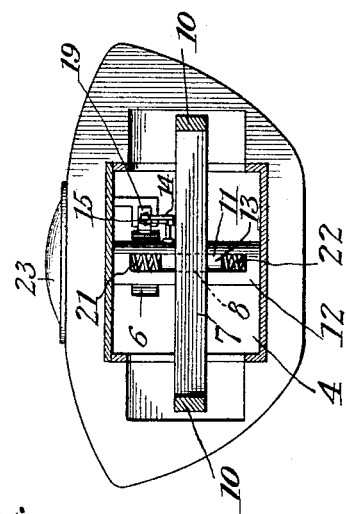
Witnesses
Fenton S. Belt
J. W. Sherwood
Inventor
James A. Pickens
By Franklin N. Hoyt
Attorney

UNITED STATES PATENT OFFICE.

JAMES A. PICKENS, OF MOBILE, ALABAMA.

WEIGHING-SCOOP.

1,116,727.  Specification of Letters Patent.  Patented Nov. 10, 1914.

Application filed May 28, 1914. Serial No. 841,632.

*To all whom it may concern:*

Be it known that I, JAMES A. PICKENS, a citizen of the United States, residing at Mobile, in the county of Mobile and State of Alabama, have invented certain new and useful Improvements in Weighing - Scoops; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in weighing scoops and it has for its object the provision of a simple, efficient and reliable scoop of this character designed especially for grocers use, the parts being so mechanically arranged that, when the article to be weighed is in the scoop, the weight of the article will cause the scoop to move downward and, through connecting mechanism, indicate upon the dial the weight of the contents of the scoop.

To these ends and to such others as the invention may pertain, the same consists in the novel construction, peculiar arrangement and adaptation of parts, all as will be more fully hereinafter described, shown in the accompanying drawings and then specifically defined in the appended claim.

Figure 1:
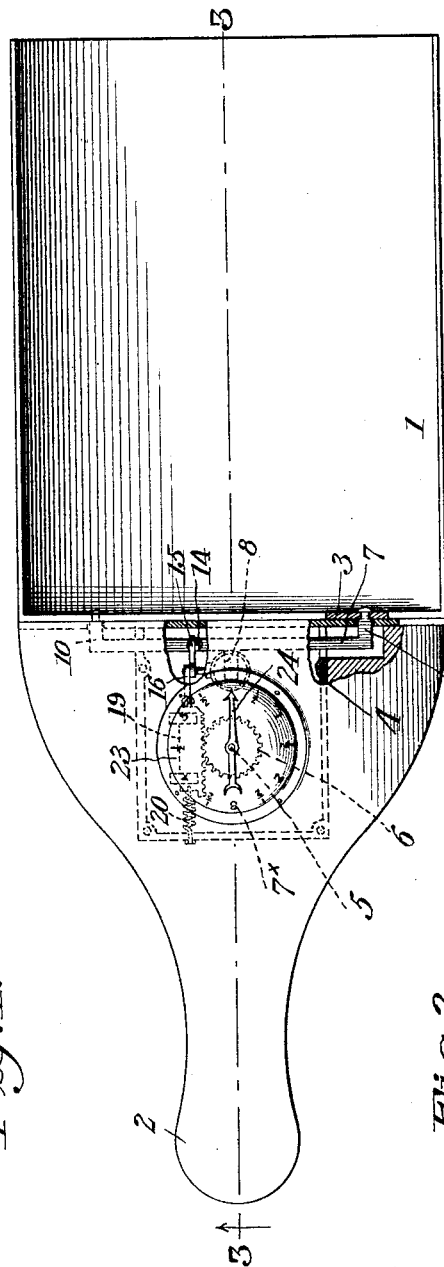
Figure 2:
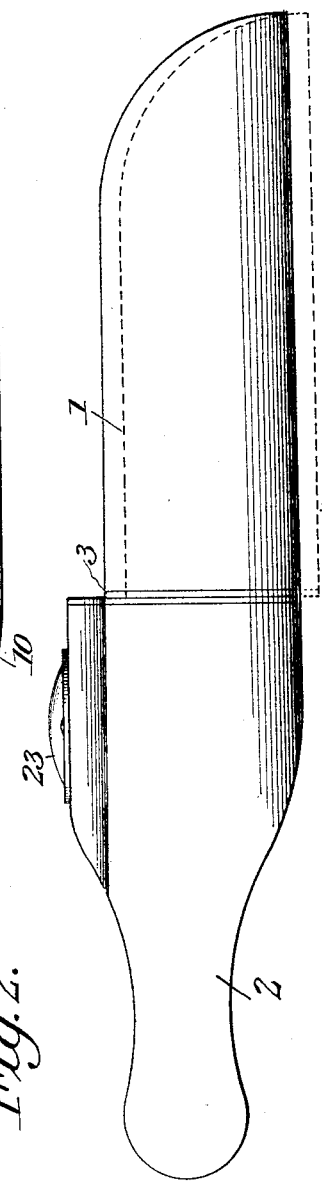

The invention is clearly illustrated in the accompanying drawings which, with the numerals of reference marked thereon, form a part of this specification and in which:

Figure 1 is a plan view of the scoop embodying my invention. Fig. 2 is a side elevation of the same. Fig. 3 is a sectional view taken on line 3—3 of Fig. 1. Fig. 4 is a transverse section on line 4—4 of Fig. 3, and Fig. 5 is an enlarged detail in perspective of the movable connecting bar carried by the handle.

Reference now being had to the details of the drawings by numeral, 1 is a scoop of ordinary form of construction having a rear wall 3 and is provided with the usual handle 2. Said handle 2 is provided at its outer end with a metallic lined chamber 4 within which chamber is positioned a vertical shaft 5 having keyed thereon, at a point near the upper portion of the chamber 4 through which it passes, a gear wheel 6 and at its extreme upper end provided with an indicating disk $7^x$, the upper face of which disk is provided with a graduating scale extending around its periphery.

7 is a transversely disposed cross bar which, at its longitudinal center, is provided with a stub arm 8. The bar 7 is secured to the outer face of the rear end of the scoop by means of headed pintles 9, 9 projecting from the arms 10, 10 which extend at right angles to the body of the bar. The stub arm 8 of the bar 7 extends through a vertically disposed opening 11 in the casing 12 within the chamber 4 and its end within the casing is secured to a vertically movable bar 13. The cross bar 7 has pivotally connected thereto by means of a link 14 one end of a lever 15, which lever at its opposite end is pivotally connected with the rack bar 19 by means of a link 16. The teeth of the rack bar engage the gear wheel 6. The bar 13 is provided at its upper end with a spiral spring 21, bearing between the block 13 in the upper wall of the chamber, and a similar spring 22 is positioned intermediate the lower edge of the bar 13 and the bottom of the chamber. A suitable transparent covering 23 may be provided to protect the indicating disk $7^x$.

From the foregoing description, the operation of the device will be readily understood. When in use, the material contained within the scoop causes the body portion of the latter to be depressed, indicated by dotted lines in Fig. 2. This depression of the scoop carries with it the cross bar 7 which is permanently secured thereto, the downward movement of the scoop, through its pivoted link connections with the rack bar 19, causing the movement of the bar in the direction of movement of the scoop, this movement of the rack bar being imparted by the engagement of its teeth with the notches of the gear wheel 6 to rotate the said wheel and the indicating pointer 24, which pointer rotates over the upper face of the indicating wheel. The position of the pointer with reference to the graduating scale upon the periphery of the disk will indicate the weight of the material within the scoop.

When the scoop is emptied of its contents, the rack bar 19 will be caused to return to its normal position through the upward movement of the scoop that has been relieved of its weight and, through the connecting lever mechanism described, will cause the pointer connected therewith to be returned to its normal position.

Having thus described my invention, what I claim to be new and desire to secure by Letters Patent is:—

In a weighing scoop of the character described, in combination with a scoop and its handle, a chamber formed within the handle and having a slot in the wall thereof, a cross bar secured to the scoop and having an arm extending through and movable within said slot, a vertically disposed shaft within the chamber, the upper end of the shaft extending above the upper face of the handle, a gear wheel keyed to the shaft within the chamber, an indicating disk carried by the upper end of the shaft, a pointer pivoted to the upper face of the disk, a vertically movable transverse block within the chamber, the said block being connected with said arm, a rack bar connected by pivotal links with the movable bar within the chamber, the teeth of said rack bar being designed to engage the teeth of the gear wheel to cause a rotation of the said wheel, a spring connected to the inner end of the rack bar, and springs connecting the upper and lower walls of the chamber with the upper and lower faces respectively of the movable cross bar, all arranged and operating substantially as shown and described and for the purpose specified.

In testimony whereof I hereunto affix my signature in presence of two witnesses.

JAMES A. PICKENS.

Witnesses:
HARRY T. SMITH,
HUGH M. CAFFEY, Jr.